Sept. 22, 1942.  H. P. MIXER  2,296,617
COLOR PHOTOGRAPHY
Filed Oct. 11, 1940  3 Sheets-Sheet 1

INVENTOR
HAROLD P. MIXER
BY John L. Sterling
ATTORNEY

Sept. 22, 1942.                H. P. MIXER                2,296,617
                            COLOR PHOTOGRAPHY
                         Filed Oct. 11, 1940            3 Sheets-Sheet 2

INVENTOR
HAROLD P. MIXER
BY John L. Sterling
ATTORNEY

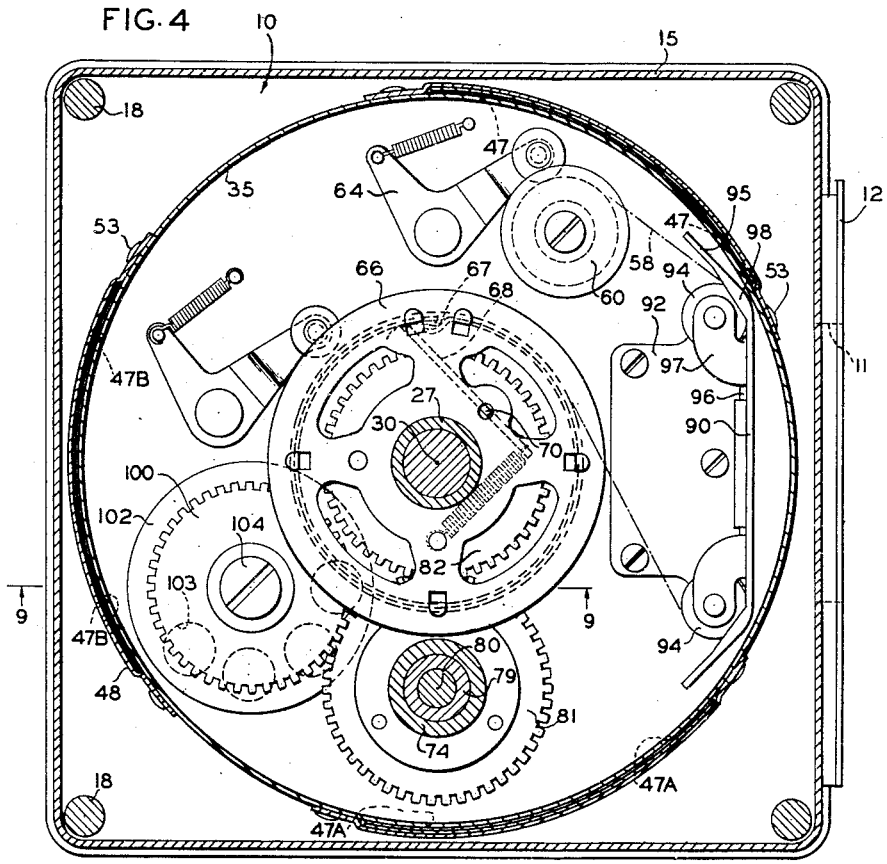

Patented Sept. 22, 1942

2,296,617

UNITED STATES PATENT OFFICE 2,296,617

COLOR PHOTOGRAPHY

Harold P. Mixer, Rockville Centre, N. Y.

Application October 11, 1940, Serial No. 360,700

8 Claims. (Cl. 95—2)

The invention relates to color photography and, more particularly, to improvements in a camera for making separation negatives for printing color photographs by the consecutive shot method.

Heretofore, it has been necessary in making separation negatives direct from a subject by the consecutive shot method to pose the subject, if alive, by bracing and other means and then changing the light sensitive medium and the filter after each exposure. During this time, which is considerable, the subject may move and also the necessary operations in changing filters and film often jars the camera, thereby resulting in poor negatives which do not register. It is also well known that certain filters have specific light characteristics of exposure which vary in a predetermined ratio, which must be maintained if a correct set of negatives is to be obtained. In other words, heretofore the art of color photography by the consecutive shot method has been a highly specialized procedure only possible with the best equipment and under perfect conditions.

It is, therefore, the principal object of this invention to provide a camera which will permit the making of separation negatives by the consecutive shot method almost instantaneously.

A further object is to provide a camera in which the color filters and film are changed mechanically during the making of the separation negatives.

A still further object is to provide a camera in which the filters may be easily changed to suit any type of lighting condition.

Another object is to provide shields for said filters which are calibrated in accordance with the light factor of each filter to insure correct balance of density between negatives.

Still another object is to provide a device which is adapted for use with any lens of any focal length providing it is color corrected.

A still further object is to provide a camera for making separation negatives by the consecutive shot method which is simple in operation, easy to manufacture and efficient in use.

The principal feature of the invention is the use of a rotating drum on the periphery of which is removably secured a plurality of interchangeable filters which are rotated by the drum between the lens and a film at a constant speed.

Another feature is a means for feeding film which operates in synchronism with the change of filters by said drum.

A further feature is the provision of an intermittent film feed which is adapted to feed film only at a time when no filter is passing between the lens and film.

A still further feature is the use of interchangeable shields over the filters which have apertures therein of an area equal to the filter ratio of each filter.

Another feature is the spacing of the filters on the drum in such manner that sufficient time is provided for feeding the film during the passage of a blind space in the drum.

A more clear conception of the operation, construction, and further objects of the invention may be had from the following specification when read in conjunction with the accompanying drawings, in which Fig. 1 is a side elevation of a camera with the invention attached;

Fig. 4 is a cross section taken along line 4—4 of Fig. 3 showing the location of the filters, shields, and film feed;

Fig. 5 is a schematic development of the drum showing the spacing of the filters, the relative size of the apertures, in the shields and the necessary filters for photography in tungsten light;

Fig. 6 is similar to Fig. 5, the filters being shown with their corresponding shields for daylight photography;

Figure 1:
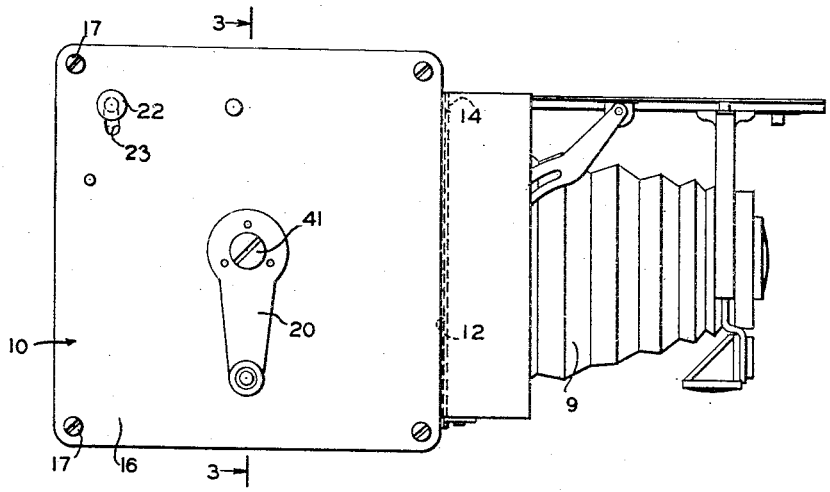

The invention is disclosed in an attachment for an ordinary bellows type camera (Fig. 1), but it is obvious that the device may well be built in a camera with very little change of design.

The attachment comprises a box-like container 10 having an opening 11 (Fig. 4) in one of the sides thereof, which is adapted to register with the open back of any well known type of camera 9. To facilitate the fastening of the attachment to a camera two rails 12 are provided which are adapted to slide in and engage a pair of offset lugs 14 secured to the back of the camera. This type of fastening is well known on certain film pack adapters for plate cameras.

Figure 2:
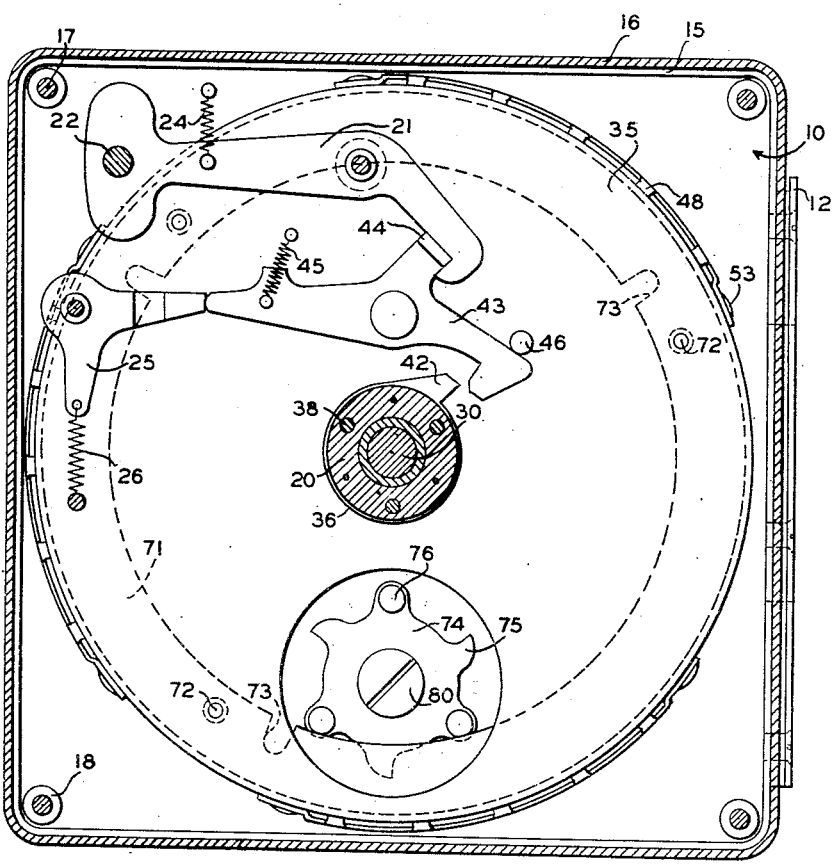
Fig. 2 is a cross section taken along line 2—2 of Fig. 3, showing the drive mechanism.

The container 10 comprises a base portion 15 and a cover portion 16 which is secured by screws 17 to tapped members 18 secured to, or formed on, the sides of the base portion. The cover plate is provided with a circular aperture 19 through which a handle 20 is adapted to extend. Pivotally mounted on the inner face of the cover is a latch member 21 formed as shown in Fig. 2. The latch member has a lug or button 22 formed thereon which extends through a slot 23 in the casing. The latch member is biased in a clockwise direction by a spring 24. Also pivotally mounted on the cover is a bell-crank 25 which acts as a stop member and is resiliently held in the position shown by the spring 26.

Figure 3:
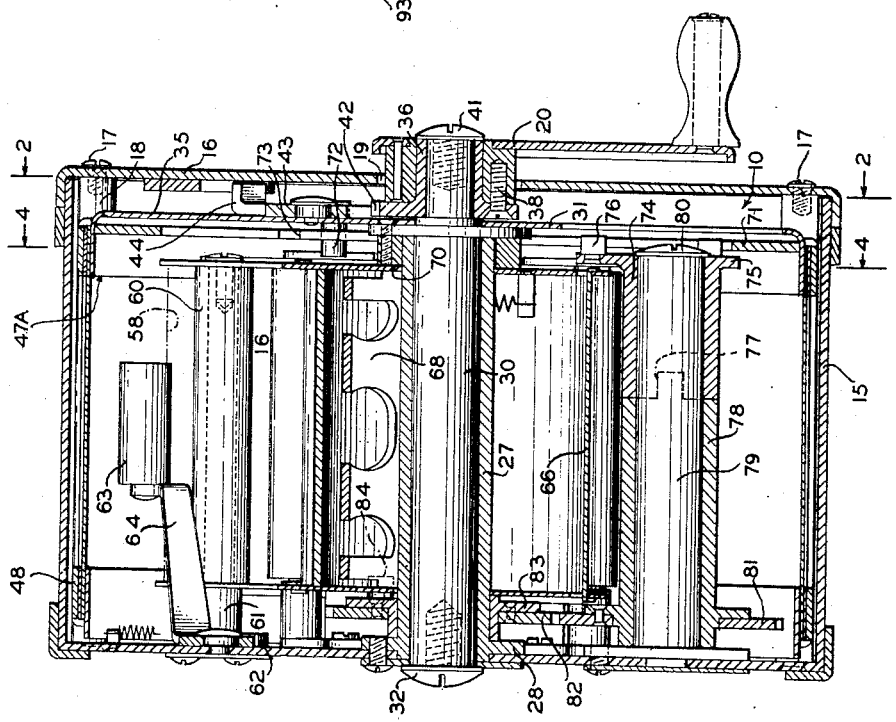
Fig. 3 is a cross section taken along line 3—3 of Fig. 1.

A sleeve 27 (Fig. 3) having a flange 28 formed on one end thereof is fastened to the base portion 15 in any well known manner, in the present instance by screws. Mounted in the sleeve 27 is a short shaft 30 which is formed with a flange 31 on one end thereof and is tapped at the other end to receive a screw 32 which retains the shaft 30 in the sleeve 27. Secured to the flange 31 is a drum 35 of any suitable material, preferably a molded plastic, which is open at its unfastened end.

Positioned on the outer end of shaft 30 is a flanged hub 36 to which the handle 20 is secured by means of screws 38. The handle and sleeve are retained on the shaft 30 by a screw 41 fastened into the tapped end of the shaft.

The flanged hub 36 has a tooth 42 formed thereon which is adapted to be engaged by a pawl member 43 pivotally mounted on the drum 35. The pawl 43 is formed as shown in Fig. 2 with a right angle lug 44 which is adapted to be engaged by the latch member 21. The pawl 43 is biased in a clockwise direction by a spring 45. The tail of the pawl is so formed as to engage the bell-crank 25. A stop pin 46 is secured in the drum 35 and so positioned that when the nose of the pawl is just clear of the periphery of the tooth 42, the pin 46 prevents further rotation thereof. The nose of the pawl is formed with a slight cam face to insure against engagement with the tooth 42 unless the pawl is positively operated.

When the latch 21 is rocked counter-clockwise by the depression of button 22, the pawl 43 is released and is rocked by spring 45 into contact with the flanged hub 36. Rotation of the handle 20 brings the tooth 42 into positive engagement with the pawl 43, which being pivotally mounted on the drum 35 causes it to be rotated. Near the end of a complete rotation or cycle of the drum the tail of the pawl engages the bell-crank 25 and rocks it counter-clockwise until the tail of the pawl snaps past after which the bell-crank returns to normal position. The spring 26 is of such strength that it does not over-balance the spring 45. Thus the pawl 43 is not disengaged from the notch 41. Continued rotation of the crank 20 brings the lug 44 into the path of the latch 21 which disengages the pawl and rocks it into the position of Fig. 2 against the stop pin 46. In this position the tail of the pawl comes into end to end engagement with the bell-crank 25, thus preventing any counter-clockwise movement of the drum 35.

Secured to the periphery of the drum over definitely spaced apertures 47 are frames or holders 48 in which may be positioned filters 50 and calibrated shields 51. The frames 48 are preferably made of spring metal riveted to the drum 35 at one edge and provided with notches 52 (Fig. 5) on the free edge. Pins 53 are secured in the drum with which the notches 52 cooperate to hold the frames in place. The filters may be of any well known type preferably gelatin and the shields are formed as shown in Figs. 5 and 6, having openings of equal length but of various widths. The width of the openings is determined by the light factor of the filter with which the shield is used and the ratio between the individual filter and the others in the group. The openings also vary as to factor rating of the type of film used. The following table illustrates the differences:

| Filter daylight | Shield opening | Tungsten | Shield opening |
|---|---|---|---|
| | Degrees | | |
| Blue (film X) 5 | 35 | 10 | 50 |
| Blue (film Y) 5 | 35 | 10 | 50 |
| Green (film X) 6 | 42 | 6 | 30 |
| Green (film Y) 7 | 49 | 6 | 30 |
| Red (film X) 7 | 49 | 4 | 20 |
| Red (film Y) 4 | 28 | 2 | 10 |

The above table shows the filter factors for daylight and tungsten or artificial light together with the angular opening in degrees of the shields used therewith for two types of film X and Y.

It will be noted that the openings in the shields vary directly as the filter factor, i. e., the filter having the highest factor having a shield with the greatest angular opening.

Using the above table, if it were desired to make negatives with film X by tungsten light, the blue filter would be positioned in the holder over the aperture 47 (Fig. 5) which is the first to pass between the lens and the film. Due to the fact that this filter has a rated factor of ten for this type of film a shield with a fifty degree opening (which is the maximum) will be placed over the filter. In the holder over aperture 47A a green filter will be placed together with a shield having a thirty degree opening due to the fact that the rating is six and in the last aperture 47B a red filter is used with a shield having a twenty degree opening. If the film to be used was the film Y the filters and shields would be the same except for the shield for the red filter which due to the fact that its rating is only one-half that of the other film would only have a ten degree opening. It will be noted that the shields (Fig. 6) for use in daylight work vary more widely, for instance, with film X the red filter uses the larger opening in the associated shield while with film Y the green filter uses the larger opening, i. e., forty-nine degrees. It is also to be noted that the shields with the red filter for both films vary as widely as possible, the film X using the maximum opening and the film Y using the minimum.

Rotation of the drum 35 brings the filters in succession between the lens of the camera and the film. In fact, the film is scanned by the filters during this rotation and, therefore, the film must be stationary. Due to this fact the film must be fed during the time a blank space between filters is passing the aperture 11. Therefore, the apertures 47, 47A, and 47B are spaced unevenly about the periphery of the drum, thus allowing time for the film to be fed. It will be noted that the filter having the largest factor and, therefore, the shield with the largest opening is placed first on the drum at aperture 47. The filter having the next lower factor is positioned in the next holder over aperture 47A and the last filter with the lowest factor over aperture 47B. It will be noted in Figs. 5 and 6 that the center lines of the apertures in the shields over apertures 47A and 47B are closer together than are those over apertures 47 and 47A, but, due to the decreasing width of the shield openings, the film is not scanned until the film has come to rest. This design permits the use of a drum of smaller diameter than if the apertures were evenly spaced on the drum.

Film feed

The film 58 (Figs. 3 and 4) is carried on a supply spool 60 which is pivotally mounted on a stub shaft 61 having a flange 62 by which it is secured to the base portion 15. A pressure roller 63 is carried on a spring-pressed bell-crank 64 and acts as a brake on the supply roll. The film 58 passes through a film gate which will be described hereinafter and thence to a small drum 66 which is rotatably mounted on the sleeve 27. The drum 66 is provided with a slot 67 with which is associated a spring-pressed holding member 68. The film after being passed through the film gate is inserted into the slot 67 until the end is gripped by the holding member. The holding member is pivotally mounted by lugs 70, which extend beyond the side of the drum 66.

The film drum is driven by the outer drum 35 (Figs. 2 and 3) through the medium of a flange 71 secured to the inner surface near the closed end thereof. At predetermined spaced intervals on the flange 71 are pins and slots 72 and 73. These pins and slots are adapted to cooperate with a star wheel 74 having alternate teeth 75 and pins 76. The star wheel has a long hub which is slotted at 77 to engage lugs on a sleeve 78 having a flange thereon. The star wheel and sleeve 78 are mounted on a stud shaft 79 which is secured to the base portion 15. The wheel and sleeve are held on the shaft by a screw 80. Secured to the flange on sleeve 78 is a gear wheel 81 (Fig. 4), which meshes with a gear 82 riveted on a flanged hub 83 mounted on the sleeve 27. This gear has a pin 84, which engages a hole in the film drum 66.

As the outer drum 35 is rotated, one of the pins on flange 71 will engage a tooth 75 on the star wheel, thus rotating a pin 76 thereon into a slot 73, which, upon further rotation of the drum, will rotate the star wheel one-third of a revolution. Through the gears 81 and 82 the film drum 66 is rotated an angular distance sufficient to feed a frame of film, which is one-third of the full amount to be fed during a full rotation of the crank 20.

Film gate

Figure 7:
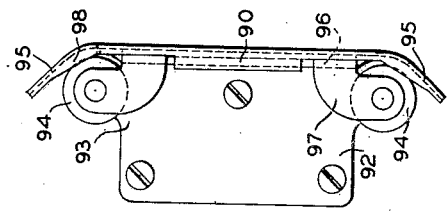
Fig. 7 is a plan view of the film gate.
Figure 8:
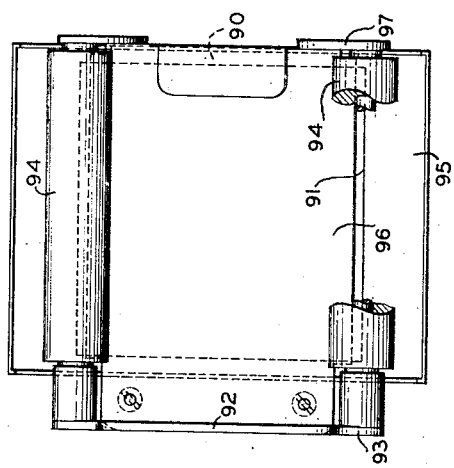
Fig. 8 is a front elevational view of Fig. 7 looking toward the lens.

The film gate comprises a plate 90 formed as shown in Figs. 4, 7, and 8 in which is an opening 91 adapted to register with the opening 11 in the casing 10. The plate 90 is formed with wings 95 which guide the film. Secured to plate 90, but spaced a sufficient distance therefrom to permit free movement of the film, is a plate 96. The plate 96 is bent at right angles to form a base 92 by which the film gate is secured to the base portion 15. The base 92 has a pair of ears 93 thereon which form bearings for one end of a pair of rollers 94. Plate 96 is also formed with ears 97 in which the other ends of the rollers 94 are journaled. A small web 98 connects the wings 95 and the flat portion of the plate 90 and overlies the rollers 94 to prevent the film from riding off the rollers. The plate 96 has no openings therein and forms a flat table which guides and positions the film to be exposed within the focal plane of the camera lens.

Exposure counter

Figure 9:
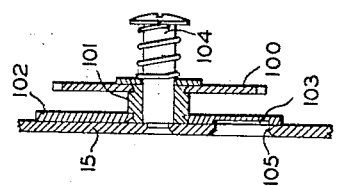
Fig. 9 is a detail cross section taken along line 9—9 of Fig. 4 showing the exposure counter.

Meshing with gear 81, which in the present disclosure has fifty-six teeth, is a gear 100, which has fifty teeth (Figs. 4 and 9). The gear 100 is secured to a hub 101 on which is secured a dial 102 containing inserts 103 carrying the designations from "one" to "four." The hub 101 is mounted on a stub shaft or stud 104 secured to the base portion 15. The hub and assembled gear and dial are spring-pressed into alignment with gear 81. An aperture 105 in the casing 15 permits dial 102 to be read.

The gear 81 is rotated as described above three revolutions to one of the handle 20. Each time handle 20 is rotated, three frames of film are fed, which exposes the three negatives from one color photograph. Therefore, the ratio of fifty-six to fifty between gears 81 and 100 will bring a new digit into register with the apertures 105, indicating the exposure of a complete set of negatives for one color photograph.

When loading the camera the counter may be reset by raising gear 100 out of mesh with gear 81 against the tension of the spring and setting the dial.

The correct exposure of the film in the present device is acquired by a little practice as the exposure is determined by the speed at which the handle 20 is rotated and the lens diaphragm opening. It is obvious that a spring motor or other type may well be substituted for the handle 20 without in any way altering the present invention. With a spring type motor a settable governor would insure a constant speed and the only determining factor for exposure would be the diaphragm setting.

The camera is loaded or the filters changed by removing the screws 17 for the cover and the screw 32 for the shaft 30. This permits the cover and the drum 35 to be removed as a unit as the shaft 30 is free to be withdrawn from the sleeve 27 without affecting the film feeding and carrying mechanism. With the drum out of the casing the filters and shields are exposed and may be easily changed. The film spool 60 and drum 66 may then be removed and new film placed thereon. The drum 66 is removed by removing the screw 80, which permits the removal of the star wheel 74, which, in turn, frees the drum. When the drum 35 is replaced in the casing, care must be exercised that the star wheel is correctly positioned, as shown in Fig. 2, so that the teeth and pins thereon will not interfere with the flange 71.

While I have described and disclosed what I believe to be an operative structure, it is obvious that many changes in construction may be made therein without departing from the spirit of the invention.

What I claim as new, and desire to secure by Letters Patent, is:

1. In a camera of the type described, a lens, a rotatable drum having a plurality of filters mounted thereon adapted to be successively positioned in register with said lens, a film roll and a winding reel therefor mounted in said drum but not rotatable therewith, and a driving means for said reel actuated by said drum for feeding film when said filters are not in register with said lens.

2. In a camera of the type described, a lens, a rotatable drum having a plurality of filters mounted thereon adapted to be successively positioned in register with said lens, a film roll and a winding reel therefor mounted within said drum but not rotatable therewith, and driving means for said reel comprising a star wheel having alternate teeth and pins thereon, an annular ring secured to said drum having a plurality of pins and slots thereon located at predetermined positions for cooperation with said pins and teeth on said wheel to rotate said wheel intermittently to feed said film a specified amount upon rotation of said drum at a time when said filters are not in register with said lens.

3. In a camera of the type described, a lens, a film, a drum rotatable between said lens and film, three color filters removably secured in the periphery of said drum, a feeding means for said film positioned within said drum, said means being intermittently driven by said drum during the time no filter is passing between said lens and film and shields for said filters having apertures therein of different area, said area varying in accordance with the light factor of the associated filter.

4. In a camera of the type described, a lens, a rotatable drum having a plurality of replaceable color filters of varying characteristics mounted thereon in definite spaced relation, shields associated with said filters, said shields being formed with openings corresponding to the light factor of its associated filter, a film roller and a reel for said film mounted within said drum but not rotatable therewith, a star wheel connected to said reel and rotatable by said drum for rotating said reel, and means for rotating said drum to cause an intermittent feeding of said film and a scanning of said film successively by said filters.

5. In a camera of the type described, a lens, a film, a rotatable drum having a plurality of filters thereon, a shield for each of said filters having an opening therein corresponding to the light factor of its associated filter and film and a feeding means for said film positioned within said drum, said feeding means being driven by said drum during the time no filter is passing between said lens and film.

6. In a camera of the type described, the combination of a lens, a drum having a plurality of filters interchangeably mounted on the periphery thereof, a film positioned within said drum, feeding means for said film intermittently driven by said drum and means for rotating said drum to pass said filters between said film and lens at a time when said film is stationary.

7. In a camera of the type described, a lens, a rotatable drum having a plurality of filters mounted thereon adapted to be successively positioned in register with said lens, a film roll and a winding reel therefor mounted in said drum, and a driving means actuated by said drum for feeding said film from said roll to said reel.

8. In a camera of the type described, a lens, a rotatable drum having a plurality of filters thereon, a shield for each of said filters having an opening therein corresponding to the light factor of its associated filter, a film positioned within said drum and means for rotating said drum to successively feed said film and interpose said filters between said lens and film.

HAROLD P. MIXER.